(12) United States Patent
Britz

(10) Patent No.: US 7,455,486 B2
(45) Date of Patent: Nov. 25, 2008

(54) DUST EXTRACTING DEVICE

(75) Inventor: Rory Britz, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 506 days.

(21) Appl. No.: 11/137,004

(22) Filed: May 25, 2005

(65) Prior Publication Data

US 2005/0268427 A1 Dec. 8, 2005

(30) Foreign Application Priority Data

May 26, 2004 (DE) .................... 10 2004 025 747

(51) Int. Cl.
*B23B 47/34* (2006.01)
(52) U.S. Cl. .................... 408/67; 408/110; 409/137; 175/213
(58) Field of Classification Search .............. 408/67, 408/14, 15, 83.5, 97, 110; 409/137; 175/213
See application file for complete search history.

(56) References Cited

U.S. PATENT DOCUMENTS

| 4,205,728 | A | * | 6/1980 | Gloor et al. ............... 175/209 |
| 5,133,729 | A | * | 7/1992 | Sjostrom .................... 606/180 |
| 5,199,174 | A | * | 4/1993 | Wild .......................... 30/123.3 |
| 5,538,040 | A | * | 7/1996 | Huber et al. ............ 137/614.19 |
| 5,605,421 | A | * | 2/1997 | Hodgson ....................... 408/67 |
| 5,904,453 | A | * | 5/1999 | Gavia .......................... 408/67 |
| 6,257,970 | B1 | * | 7/2001 | Huber ........................ 451/357 |
| 6,328,643 | B1 | * | 12/2001 | Huber ........................ 451/357 |
| 6,969,311 | B2 | * | 11/2005 | Chen et al. ................... 451/359 |
| 7,226,251 | B2 | * | 6/2007 | Janson ........................ 408/1 R |
| 7,281,886 | B2 | * | 10/2007 | Stoerig ........................ 408/67 |
| 2006/0153650 | A1 | * | 7/2006 | Simm et al. .................. 408/58 |

* cited by examiner

*Primary Examiner*—Daniel W Howell
(74) *Attorney, Agent, or Firm*—Abelman, Frayne & Schwab

(57) ABSTRACT

An extracting device (4) for removing material cut away in the operation of a motor-driven hand tool, has an extracting opening (48) and a receiving space (18) for the cut material, which communicate with one another through an extracting path, and an air current generator (42) for generating an air current (L) from the extracting opening (48) to the receiving space (18). A closure device (20) is provided between the extracting opening (48) and the receiving space (18), which at least substantially places the extracting path in a closed position and which is operated by the air current (L). The closure device (20) is arranged between the extracting opening (48) and the air current generator (42) and the closure device (20) has a closure element (22), which can be removed from a valve seat (24) by means of an underpressure created by the air current generator (42) for forming an open position of the closure device.

6 Claims, 3 Drawing Sheets

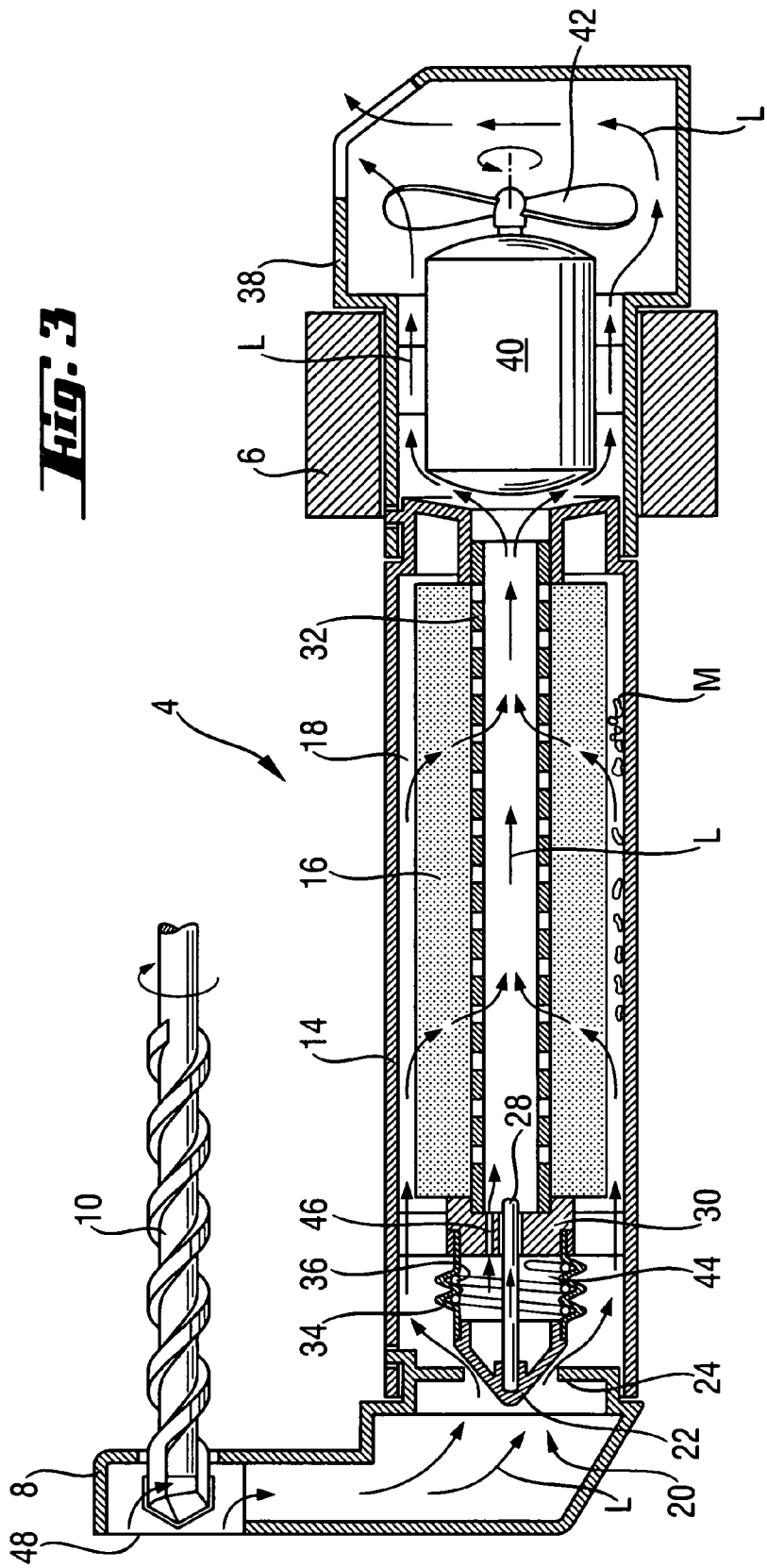

DUST EXTRACTING DEVICE

BACKGROUND OF THE INVENTION

The invention relates to an extracting device for removing material cut during operation of a motor-operated hand tool, which is attached to the hand tool for extracting such material, the device having an extracting opening and a receiving space for receiving the cut material, which is combined together over an extracting path with an air current from the extracting opening to the receiving space, wherein a closure mechanism is provided between the extracting opening and the receiving space, having a closed position at least substantially closing the extracting path and is operated by the air current.

In an extracting device of this type, the closure device assures, that after the air current generator is switched off and independently of the orientation of the hand tool and the extracting device fastened to it, no cut material is released from the receiving space through the extracting opening.

U.S. Pat. No. 6,047,693 discloses a motor-driven cutting tool having an extracting device attached to it. The extracting device has an extracting opening, which communicates through an extracting hose with a collecting bag. When operating the cutting tool, a fan generates a suction current from the extracting opening to the collecting bag. When this is done an elastic, disklike closure element that completely blocks the open flow cross-section of the extracting hose, is partially opened by deflection in the direction of the collection bag. After the fan is switched off, the relaxing collection bag releases into the extracting hose an airflow opposite to the extracting current in the direction of the extracting opening, whereby the closure element is urged against an annular stop and thereby blocks the collecting bag from the extracting opening.

This type of closure device is relatively prone to malfunction. Accordingly, it frequently happens that when the fan is switched off, extracted material becomes stuck between the closure element and the stop and complete closing of the closure device is prevented. In addition, it is also possible that over time the closure element is permanently deformed, whereby incomplete closing can result. In addition, by virtue of the opening of the closure element, turbulence is produced in the extracting hose, which results in clear flow losses and reduced extracting performance.

SUMMARY OF THE INVENTION

The object of the present invention is to eliminate the aforementioned drawbacks by an extracting device held on a hand tool and to provide, in a simple fashion, a secure closing of the receiving space from the extracting opening.

According to the invention, this object is achieved in that the closure device is arranged between the extracting opening and the air current generator and the closure device has a closure element, which is urged against a valve seat in a closed position and in an open position is separated from the valve seat by virtue of a negative pressure built up by the air current generator. This type of closure device has the advantage that in the switched off state of the extracting device or in the event of the absence of air current in the suction path, it is reliably closed. On the other hand, a closure device with the air current generator switched on is easily automatically opened.

In a preferred embodiment the closure element partially delimits a receiving chamber open to the air current generator, in that the underpressure builds up with the air current generator switched on. In this fashion a reliable automatic opening of the closure device occurs. When this is done, only a small part of the generated air current is used for operating the closure element, which allows good extracting performance.

Advantageously, the closure element runs linearly, whereby a peripherally uniform opening and a particularly tight closing of the closure element is made possible.

Preferably, the guide is realized using a guide bar connected with the closure element and arranged parallel to the extracting path, the guide rod being mounted linearly displaceably. In this fashion, disruptions of the air current due to the required elements for guiding of the closure are reduced.

Advantageously, the closure element is biased by a bellows against the valve seat, whereby a peripherally uniform pressing of the closure element is effected and consequently a particular tight closing of the closure device is made possible.

In addition, the bellows is advantageously supported for increasing its bias against the valve seat by using a spring element. Thereby it is possible in simple fashion to adjust the required tension for deformation of the bellows, so that the closure device is tightly closed in the closed position and is sufficiently widely opened in the open position by the underpressure.

Thus it is particularly advantageous, if the spring element is formed by a helical spring, which is engaged with a correspondingly formed, screwlike pleated structure of the bellows. In this fashion on the one hand, a uniform and secure support of the bellows by the spring element is provided and on the other hand the require structural space is kept to a minimum.

In a particularly advantageous embodiment, the closure element is conically-shaped and tapers inwardly in the direction of the valve seat. In this fashion, the closure element centers itself upon closing, whereby a particularly tight closure is made possible.

BRIEF DESCRIPTION OF THE DRAWING

The invention will be explained below in more detail using an exemplary embodiment. Wherein:

FIG. 3 represents an axially extending section through the extracting device of FIG. 1 in an open position.

DETAILED DESCRIPTION OF THE INVENTION

Figure 1:
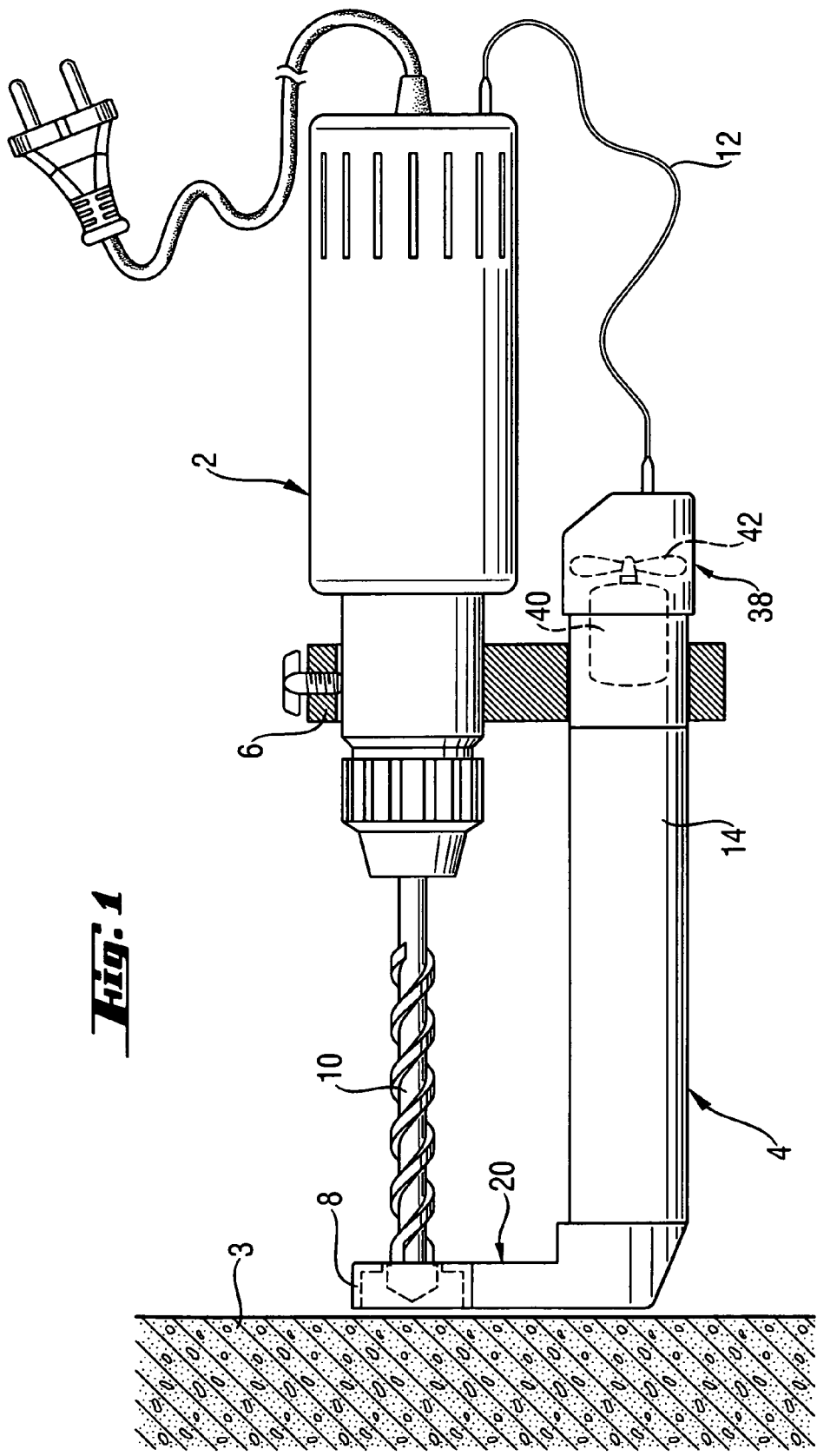
FIG. 1 represents a top view of a drilling tool with an extracting device according to the invention.

FIG. 1 shows a hand-guided electrical drilling device 2, for example in the form of a hammer drill, which is used for drilling holes in a work piece 3. To avoid soiling the surrounding area with the drill cuttings and dust produced during the drilling operation, an extracting device 4 is removably mounted on the drilling machine 2 using a carrier device 6. Alternatively, the extracting device 4 can also be integrated into the drilling machine 2.

Figure 2:
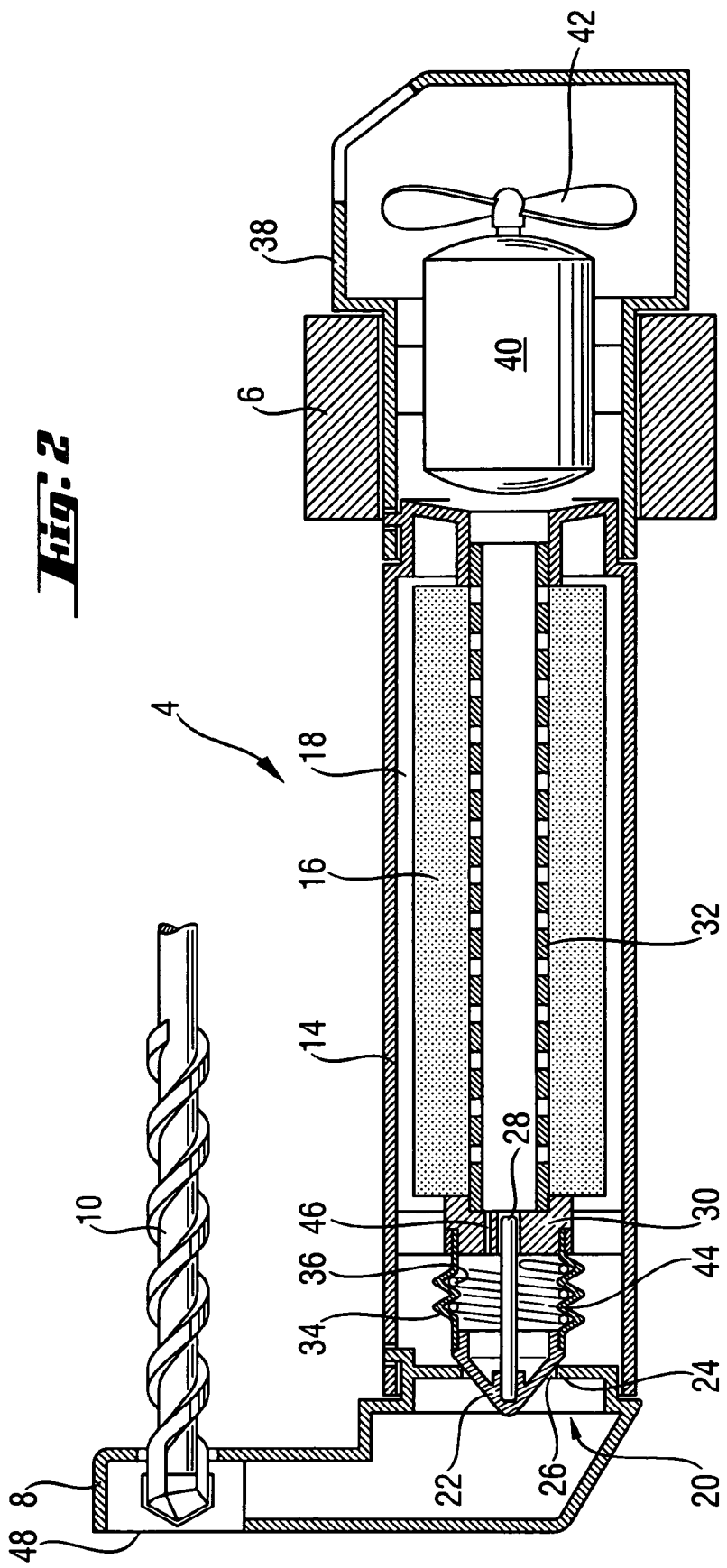
FIG. 2 represents an axially extending section through the extracting device of FIG. 1 in a closed in a closed position.

The extracting device 4 has an extracting head 8, through which a drilling tool 10 of the drilling machine 2 is passed during operation. By switching on the drilling machine 2, the extracting device 4 is simultaneously put into operation, which is supplied with power through an electrical connection 12 from the drilling machine 2. As can be seen in FIG. 2, the extracting device 4 has a receiving tube 14, in which a filter element 16 is held. Thus, between the receiving tube 14 and the filter element 16, a receiving space 18 is formed, into which the extracted cuttings and drilling dust can be collected.

A closure device 20 is provided between the extracting head 8 and the receiving space 18 in the receiving tube. The device has a conically-shaped closure element 22, bearing against a valve seat 24 in the closed position and having a circular passage opening 26. An axially extending guide rod 28 projects from the closure element 22 parallel to the receiving tube 14. The closure element 22 is linearly displaceable on a carrier element 30 using this guide rod 28, the carrier element being inserted into the receiving tube 14 and carries at a first end of a filter tube 32 of the filter element 16 on the side facing away from the closure element 22.

A bellows 34 is provided between the closure element 22 and the carrier element 30, for urging the closure element 22 in the direction of the valve seat 24 and thus biases the closure device 20 into a closed position. Internally the bellows 34 is supported additionally by a helical spring 36 for generating a sufficient contact pressure, which allows a tight closure of the closure device 20. To achieve this, the bellows 34 has a helical pleated structure, which is drawn onto the helical spring 36 and thus is engaged with it in the axial direction.

The closure element 22 and the bellows 34 enclose an extracting chamber 44, which is communicated through the pressure compensation aperture 46 in the carrier element 30 with the first end of the filter tube 32. A second end of the filter tube 32 opens into a motor housing 38, in which an air current generator 42 driven by a motor 40 is provided in the form of a fan.

FIG. 3 shows the extracting device 4 in operation. Here, the air current generator 42 is set into rotation by the motor 40 and generates an air current L represented by the arrows along an extracting path. The air present in the extracting chamber 44 is initially transported by the air current L over the pressure compensation aperture 46 and the filter tube 32 past the motor 40 and out of the motor housing 38. Accordingly, an underpressure occurs in the extracting chamber 44, by which the closure element 22 is moved from the closed position at the valve seat 24 by the bellows 34 and the helical spring 36. When this is done, the closure element 22 is guided linearly over the guide rod 28 on the carrier element 30 parallel to the receiving tube 14. In this manner, the closure device 20 between the closure element 22 and the valve seat is opened. The closure device is now in the open position.

As a consequence, the air is now also aspirated by means of the air current generator 42 from an extracting opening 48 of the extracting head 8, passed through by the drilling tool 10 in the drilling operation, through the closure device 20, into the receiving tube 18 and through the filter element 16. When this is done, the cuttings removed from the work piece 3 by the drilling tool 10 during operation are retained by the filter element 16 in the receiving space 18, as is represented in FIG. 3 by material particles M. It remains here, until the receiving tube 14 is opened and emptied.

The cleaned air flows further over the filter tube 32 into the motor housing 38, from where it is discharged to the environment.

When the air current generator 42 is switched off, the closure device 20, as the result of the spring force of the bellows 34 and the helical spring 36, is returned again to the closed position according to FIG. 2, and the closure element 22 is now again urged against the valve seat 24. Accordingly, the extracting path from the suction head 8 to the motor housing 38 is again blocked. In this fashion, independent of the orientation of the extracting device 4 in space, escape of the cuttings collected in the receiving space 18 through the extracting head 8 is prevented.

What is claimed is:

1. An extracting device (4) for removing material generated in operation of a motor-driven hand tool, comprising means forming an extracting opening (48) and a receiving space (18) for receiving the material from the extracting opening (48) for flow along an extracting path, an air current generator (42) located within said means and spaced from extracting opening (48) forming an air current (L) flowing from said extracting opening (48) through said receiving space (18), a closure device (20) located in said means between said extracting opening (48) and said receiving space (18), and operated by said air current (L) and having a closed position at least substantially closing the extracting path, said closure device (20) having a closure element (22) displaceable from a closed position on a valve seat (24) by an underpressure developed by the air current (L) when said air current generator (42) is operating, wherein said closure element (22) forms an end in air extracting chamber (44) open to said air current generator (42), said extracting chamber (44) develops the underpressure when said air current generator (42) is operated, wherein said closure element (22) is displaceable linearly, and wherein an axially extending guide rod (28) is linearly displaceable in said extracting chamber, is connected to said closure element (22) and extends generally parallel to said extraction path.

2. An extraction device, as set forth in claim 1, wherein said closure element (22) is biased by a bellows (34) located within said extracting chamber (44) against said valve seat (24).

3. An extracting device, as set forth in claim 2, wherein said bellows (34) is supported by a spring element (36) for increasing the biasing action of said closure element (22) against said valve seat (24).

4. An extracting device, as set forth in claim 3, where said spring element is a helical spring (36) in engagement with said bellows (34) which is correspondingly helically shaped.

5. An extracting device (4) for removing drilled material generated in operation of a motor-driven hand tool, comprising means forming an extracting opening (48) and a receiving space (18) for receiving the drilled material from the extracting opening (48) for flow along an extracting path; an air current generator (42) located within said means and spaced from extracting opening (48) forming an air current (L) flowing from said extracting opening (48) through said receiving space (18); a closure device (20) located in said means between said extracting opening (48) and said receiving space (18), and operated by said air current (L) and having a closed position at least substantially closing the extracting path, said closure device (20) having a closure element (22) linearly displaceable from a closed position on a valve seat (24) by an underpressure developed by the air current (L) when said air current generator (42) is operating, wherein an axially extending guide rod (28) is linearly displaceable in said extracting chamber, is connected to said closure element (22) and extends generally parallel to said extraction path.

6. An extracting device, as set forth in claim 5, wherein said closure element (22) is conically shaped and tapers inwardly in the direction toward said valve seat (24).

* * * * *